United States Patent [19]

Shaffer et al.

[11] Patent Number: 5,510,443
[45] Date of Patent: Apr. 23, 1996

[54] PROCESS FOR PREPARING A COATING WITH IMPROVED RESISTANCE TO YELLOWING AND THE RESULTING COATING

[75] Inventors: Myron W. Shaffer, Coraopolis; Terry A. Potter, Beaver, both of Pa.; Lanny D. Venham, Paden City; Peter D. Schmitt, Glen Dale, both of W. Va.

[73] Assignee: Bayer Corporation, Pittsburgh, Pa.

[21] Appl. No.: 31,423

[22] Filed: Mar. 15, 1993

[51] Int. Cl.$^6$ .................................................. C08G 18/32
[52] U.S. Cl. .................... 528/45; 252/182.2; 427/333; 427/337; 427/407.1; 428/423.1; 525/124; 528/65; 528/66; 528/75; 528/76; 528/85; 560/330
[58] Field of Search ................... 528/45, 65, 66, 528/76, 85, 75; 560/330; 252/182.2; 428/423.1; 525/124; 427/333, 337, 407.1

[56] References Cited

U.S. PATENT DOCUMENTS

| | | |
|---|---|---|
| 3,929,726 | 12/1975 | Schollenberger et al. . |
| 4,145,512 | 3/1979 | Uhrhan et al. ............... 528/73 |
| 4,178,279 | 12/1979 | Uhrhan et al. . |
| 4,369,301 | 1/1983 | König et al. ................ 528/45 |
| 4,447,571 | 5/1984 | Dabi et al. ................. 524/192 |
| 4,781,987 | 11/1988 | Bolgiano et al. .......... 428/425.3 |
| 4,857,596 | 8/1989 | MacLeay et al. .......... 525/142 |
| 5,091,475 | 2/1992 | Potter et al. ............... 528/45 |
| 5,112,931 | 5/1992 | Potter et al. ............... 528/45 |
| 5,132,387 | 7/1992 | Baron et al. ............... 528/49 |
| 5,216,078 | 6/1993 | Cook et al. ................ 528/45 |
| 5,232,988 | 8/1993 | Venham et al. ............ 528/45 |
| 5,281,443 | 1/1994 | Briggs et al. .............. 427/407.1 |

Primary Examiner—Nathan M. Nutter
Assistant Examiner—John M. Cooney, Jr.
Attorney, Agent, or Firm—Joseph C. Gil; Thomas W. Roy

[57] ABSTRACT

The present invention relates to process for preparing a coated substrate having improved resistance to yellowing which comprises coating a substrate with a one-component coating composition containing a) a blocked polyisocyanate which is the reaction product of a polyisocyanate with an oxime or lactam blocking agent for isocyanate groups and b) a compound containing at least two isocyanate-reactive groups, provided that component a) and/or component b) contains the group, —CO—(R)N—N(R)—CO—, wherein R represents hydrogen or an optionally substituted hydrocarbon radical, in an amount of 0.01 to 5% by weight, based on the solids content of components a) and b), by applying the one-component coating composition wet-on-wet to a coating composition containing acid groups and/or melamine resins which has previously been applied to the substrate or by adding a melamine resin to the one-component coating composition prior to applying it to the substrate, which may optionally have been precoated.

The present invention also relates to the coated substrate having improved resistance to yellowing prepared by this process.

32 Claims, No Drawings

PROCESS FOR PREPARING A COATING WITH IMPROVED RESISTANCE TO YELLOWING AND THE RESULTING COATING

BACKGROUND OF THE INVENTION

1. Field of the Invention

The present invention relates to a process for coating a substrate with a one-component coating composition containing oxime- or lactam-blocked polyisocyanates in the presence of acids or melamine resins to provide a coated substrate with improved resistance to yellowing.

2. Description of the Prior Art

There is a need in the automotive industry for topcoats which can be applied over existing basecoats and which provide improved properties when compared to conventional thermoset melamine/acrylics. Recently, two-component polyurethane coatings have increasingly been used as clearcoats. These coatings possess excellent environmental etch resistance as well as excellent appearance, durability, hardness and flexibility.

The two-component polyurethane coating compositions suffer from one major disadvantage, i.e., they require two-component spray equipment as opposed to the thermoset melamine/acrylics which are applied using one-component equipment. Therefore, an additional capital expenditure is required to obtain the necessary spray equipment for applying the two-component polyurethane coating compositions.

One possibility for providing a one-component polyurethane coating composition would be to convert the existing two-component polyurethane coating compositions by blocking the isocyanate groups of the polyisocyanate component. In this regard oxime-blocking agents are the preferred blocking agent because they possess storage stability in combination with a low unblocking temperature.

One of the difficulties of oxime- or lactam-blocked polyisocyanates is that when they come into contact with melamine resins or acids, they exhibit increased yellowing when compared to similar coatings which are not in contact with or blended with melamine resins or acids. The amount of yellowing increases as the curing temperature increases. Accordingly, blocking agents which require higher deblocking temperatures may suffer from increased yellowing due to the higher deblocking temperature. Such contact may occur when coating compositions containing oxime- or lactam-blocked polyisocyanates are applied as clearcoats over acid-containing and/or melamine-resin containing, thermoplastic or thermoset basecoats; when they are applied wet-on-wet as unicoats over acid-containing and/or melamine resin-containing primers; or when the coating compositions contain oxime- or lactam-blocked polyisocyanates in combination with acids and/or melamine resins.

Accordingly, it is an object of the present invention to provide one-component polyurethane coating compositions which may be applied in the presence of acids and/or melamine resins to provide coatings with improved resistance to yellowing without a significant reduction in any of the other valuable properties associated with polyurethane coating compositions.

This object may be achieved in accordance with the present invention by the use of the blocked polyisocyanates described hereinafter.

SUMMARY OF THE INVENTION

The present invention relates to process for preparing a coated substrate having improved resistance to yellowing which comprises coating a substrate with a one-component coating composition containing a) a blocked polyisocyanate which is the reaction product of a polyisocyanate with an oxime or lactam blocking agent for isocyanate groups and b) a compound containing at least two isocyanate-reactive groups, provided that component a) and/or component b) contains the group, —CO—(R)N—N(R)—CO—, wherein R represents hydrogen or an optionally substituted hydrocarbon radical, in an amount of 0.01 to 5% by weight, based on the solids content of components a) and b), by applying the one-component coating composition wet-on-wet to a coating composition containing acid groups and/or melamine resins which has previously been applied to the substrate or by adding a melamine resin to the one-component coating composition prior to applying it to the substrate, which may optionally have been precoated.

The present invention also relates to the coated substrate having improved resistance to yellowing prepared by this process.

DETAILED DESCRIPTION OF THE INVENTION

The one-component coating compositions which are used in the process according to the invention to prepare the coated substrates contain the group, —CO—(R)N—N(R)—CO—, in an amount of 0.01 to 5% by weight, preferably 0.05 to 4% by weight, more preferably 0.1 to 2% by weight and most preferably 0.2 to 1% by weight, based on the solids content of components a) and b). These percentages by weight are determined based on the group, —CO—N—N—CO—, (MW 84). The group, —CO—(R)N—N(R)—CO—, wherein R represents hydrogen or an optionally substituted hydrocarbon radical, may be incorporated in either or both of the blocked polyisocyanate or the compound containing isocyanate-reactive groups as described hereinafter.

Suitable polyisocyanates for use in preparing the blocked polyisocyanates of the present invention include the known polyisocyanates of polyurethane chemistry. Examples of suitable low molecular weight polyisocyanates are those having a molecular weight of 168 to 300. Preferred polyisocyanates are those having aliphatically and/or cycloaliphatically bound isocyanate groups such as 1,6-hexamethylene diisocyanate, 2,2,4- and/or 2,4,4-trimethyl-1,6-hexamethylene diisocyanate, dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethylcyclohexane (isophorone diisocyanate or IPDI), bis-(4-isocyanatocyclohexyl)-methane (HMDI), 1,3- and 1,4-bis-(isocyanatomethyl)-cyclohexane, bis-(4-isocyanato-3-methylcyclohexyl)-methane, xylylene diisocyanate, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, and 2,4- and/or 2,6-hexahydrotoluylene diisocyanate.

Also suitable though less preferred are aromatic polyisocyanates such as 2,4'- and/or 4,4'-diisocyanatodiphenyl methane and mixtures of these isomers with their higher homologs which are obtained in known manner by the phsogenation of aniline/formaldehyde condensates, 2,4- and/or 2,6-diisocyanatotoluene and mixtures of these compounds. If used, the aromatic polyisocyanates are preferably used in an amount of up to 40 weight percent, more preferably up to 20 weight percent, based on the weight of the polyisocyanates. Most preferably, the aromatic polyisocyanates are not used.

Instead of the previously mentioned monomeric diisocyanates, it is preferred in accordance with the present invention to use the known derivatives of these monomeric polyisocyanates to prepare the blocked polyisocyanates. These polyisocyanate adducts include polyisocyanates containing biuret groups as described, for example, in U.S.Pat. No. 3,124,605, U.S. Pat. No. 3,201,372 and DE-OS 1,101,394; polyisocyanates containing isocyanurate groups as described, for example, in U.S. Pat. No. 3,001,973, DE-PS 1,022,789, 1,222,067 and 1,027,394 and DE-OS 1,929,034 and 2,004,048; polyisocyanates containing uretdione groups and prepared by oligomerizing a portion of the isocyanate groups of a diisocyanate in the presence of a trialkyl phosphine catalyst; polyisocyanates containing oxadiazinetrione groups and containing the reaction product of two moles of a diisocyanate and one mole of carbon dioxide; polyisocyanates containing urethane groups as described, for example, in DE-OS 953,012, BE-PS 752,261 and U.S. Pat. No. 3,394,164 and 3,644,457; polyisocyanates containing carbodiimide groups as described in DE-PS 1,092,007, U.S. Pat. No. 3,152,162 and DE-OS 2,504,400, 2,537,685 and 2,552,350; polyisocyanates containing allophanate groups as described, for example, in GB-PS 994,890, BE-PS 761,626 and NL-OS 7,102,524; and polyisocyanates containing allophanate and isocyanurate groups as described, for example, in copending applications, U.S. Ser. Nos. 07/644,174, 07/733,549 and 07/733,566, the disclosures of which are herein incorporated by reference.

Preferred polyisocyanate adducts are the biuret group-containing polyisocyanates prepared from 1,6-hexamethylene diisocyanate, the isocyanurate group-containing polyisocyanates prepared from 1,6-hexamethylene diisocyanate and/or isophorone diisocyanate and polyisocyanate adducts containing allophanate groups and isocyanurate groups, especially those prepared from 1,6-hexamethylene diisocyanate.

Also preferred for use as the polyisocyanate starting component according to the invention are the mixtures of i) polyisocyanates containing isocyanurate groups and ii) unreacted starting diisocyanate which are described in copending application, U.S. Ser. No. 07/896,702, herein incorporated by reference. The amounts of the individual components are controlled by the percentage of isocyanate groups which are trimerized to form isocyanurate groups. The final product contains at least 5%, preferably at least 10% of unreacted diisocyanate. The isocyanate content of the polyisocyanate component increases as the amount of unreacted diisocyanate increases. To the contrary the isocyanate content decreases as the amount of component i) increases.

To obtain these polyisocyanate mixtures, at least 5%, preferably at least 20% and more preferably at least 25%, of the isocyanate groups are trimerized. The upper limit for the amount of isocyanate groups which are trimerized is 85% or less, preferably 75% or less and more preferably 65% or less.

The polyisocyanate mixtures containing isocyanurate groups are prepared by trimerizing a portion of the isocyanate groups of a cyclic diisocyanate having (cyclo)aliphatically bound isocyanate groups. The term "(cyclo)aliphatic" is defined to include both aliphatically and/or cycloaliphatically bound isocyanate groups. The cyclic groups may be either aromatic or cycloaliphatic, provided that the isocyanate groups are (cyclo)aliphatically bound. Examples of these cyclic diisocyanates include those previously set forth for preparing the polyisocyanate adducts. Preferred cyclic diisocyanates are HMDI and IPDI, with HMDI being especially preferred.

The trimerization reaction is terminated when the desired percentage of isocyanate groups has been trimerized. However, it is possible to terminate the reaction before the desired percentage of isocyanate groups has been trimerized and then remove unreacted HMDI from the mixture, e.g., by distillation, until a product is obtained which contains the desired percentage of trimerized isocyanate groups. It is also possible to trimerize more than 85% of the isocyanate groups and then add starting diisocyanate until the percent of trimerized isocyanate groups is within the disclosed ranges. These latter two embodiments require additional process steps and, thus, are not preferred.

If the blocked polyisocyanates according to the invention are to contain the required structural units, then they are prepared by reacting the polyisocyanate starting component with an oxime or lactam blocking agent and also hydrazine and/or an organic additive which is soluble in either the polyisocyanate, the oxime blocking agent or an optional organic solvent for the polyisocyanate and contains the group, H(R)N—NR—CO—, wherein the carbonyl group is bound to carbon, oxygen or nitrogen and R represents hydrogen or an optionally substituted hydrocarbon radical, preferably a substituted or unsubstituted aliphatic hydrocarbon radical containing 1 to 20 carbon atoms, a substituted or unsubstituted araliphatic hydrocarbon radical containing 7 to 22 carbon atoms or a substituted or unsubstituted cycloaliphatic hydrocarbon radical containing 5 to 12 carbon atoms; R is preferably hydrogen. Examples of additives containing these groups are hydrazides, semicarbazides, carbazic esters and the corresponding thio compounds.

The compounds containing the previously described groups must be soluble in one or more of the polyisocyanate, blocking agent or optional polyisocyanate solvent. One method for obtaining this solubility is through the use of organic additives which contain a cyclic group. Examples of these compounds include the organic hydrazides disclosed in U.S. Pat. No. 3,929,726 (herein incorporated by reference) such as benzoic acid hydrazide, p-hydroxybenzoic acid hydrazide, β-naphthoic acid hydrazide or the isomeric terephthalic acid hydrazides; and those disclosed in U.S. Pat. No. 4,857,596 (herein incorporated by reference) such as 3-(4-hydroxy-3,5-di-t-butyl-phenyl)-propionic acid hydrazide and 2-hydroxy-3-t-butyl-5-methylphenyl acetic acid hydrazide.

Preferred organic compounds are the hindered amine light stabilizers disclosed in U.S. Pat. Nos. 4,178,279, 4,983,738, 5,043,372 and 5,132,387, the disclosures of which are herein incorporated by reference. Examples of these compounds include 2,2,6,6-tetra-alkyl-piperidine derivatives containing the —CO—NR—N(R)H group attached to carbon or nitrogen, N-(2,2,6,6-tetraalkyl-4-piperidinyl)amic acid hydrazides and N,N'-hydrocarbylene-bis-[N-(2,2,6,6-tetraalkyl-4-piperidinyl)-amic acid hydrazides].

Also suitable are the hydrazine adducts disclosed in U.S. Pat. No. 4,369,301, the disclosure of which is herein incorporated by reference. These adducts are formed by reaction hydrazine or hydrazine hydrate with cyclic alkylene carbonates having 5- or 6-membered rings such as ethylene glycol carbonate, propylene glycol carbonate (2-oxo-4-methyl-1,3-dioxolane), 2-oxo-4-hydroxymethyl -1,3-dioxolane (reaction product of 1 mole of glycerine with 1 mole of diphenyl carbonate) and 1,3-dioxanone-(2)-ring compounds obtained, for example, by reacting 1,3-propane diol or neopentyl glycol with diphenyl carbonate. Preferred cyclic carbonates are ethylene glycol carbonate and propylene glycol carbonate.

If it is desired to exclusively incorporate the required amounts of hydrazine or the additives containing the group, —CO—N—N—CO—, into the polyisocyanate component, these additives are generally incorporated into the polyisocyanates in quantities sufficient to react with 0.1 to 40 equivalent percent, preferably 0.5 to 30 equivalent percent, more preferably 1.0 to 15 equivalent percent and most preferably 1.5 to 9.0 equivalent percent, of the isocyanate groups of the polyisocyanate prior to blocking.

When the additives are incorporated into the polyisocyanate component, the blocking agents are incorporated into the polyisocyanates in quantities sufficient to react with 60 to 99.9 equivalent percent, preferably 70 to 99.5 equivalent percent, more preferably 85 to 99 equivalent percent and most preferably 91 to 98.5 equivalent percent, of the isocyanate groups of the polyisocyanate prior to blocking. When it is desired to incorporate the additive into the isocyanate-reactive component, the blocking agent is preferably reacted with all of the isocyanate in order to completely block all of the isocyanate groups. It is possible, although not preferred, to allow some of the isocyanate groups to remain unreacted. These groups may be subsequently reacted, e.g. , when the blocked polyisocyanate is mixed with the isocyanate-reactive compound to form the one-component coating composition. Preferably, the percentages of isocyanate groups which react with the additives and the blocking agents add up to 100%.

The above percentages are based on the isocyanate groups which react with the additive and those which react with the blocking agent. The isocyanate groups which react with each other or with low molecular weight isocyanate-reactive compounds to form the previously described polyisocyanate adducts are not included in the calculation of these percentages, even if the reaction to form the polyisocyanate adducts is conducted after the reaction with the blocking agent and the additive.

Examples of suitable blocking agents include lactams such as ε-caprolactam and δ-valerolactam and oximes corresponding to the formula

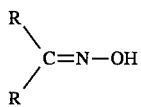

wherein

R may be the same or different and represents hydrogen, an alkyl group having 1 to 10, preferably 1–6 carbon atoms, a cycloaliphatic group having 5 to 15 carbon atoms, an araliphatic group having 7 to 15 carbon atoms or an aromatic group having 6 to 15 carbon atoms, or the two R radicals and the carbon atom may form a cycloaliphatic group which may contain hetero atoms.

Preferred blocking agents include methyl ethyl ketoxime (butanone oxime), methyl amyl ketoxime and cyclohexanone oxime. Methyl ethyl ketoxime is especially preferred.

The preparation of the blocked polyisocyanate of the present invention may be carried out according to several embodiments. For example, all or a portion of the blocking reaction may be conducted before the addition of the organic additive, or all or a portion of the organic additive may be reacted before the addition of the blocking agent. In one preferred embodiment, the organic additive is dissolved in the blocking agent and the mixture is then reacted with the polyisocyanate. The reactions are preferably carried out at an elevated temperature (e.g., about 40° to 120° C.), and optionally in the presence of a suitable catalyst, for example, tertiary amines or metal salts.

To prepare the one-component coating compositions in accordance with the present invention the blocked polyisocyanates are blended with known high molecular weight compounds containing isocyanate-reactive groups, preferably hydroxyl groups, and optionally with low molecular weight isocyanate-reactive compounds. Examples of the high molecular weight compounds include polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyhydroxy polycarbonates and polyhydroxy polyacrylates are preferred. These compounds contain at least 2, preferably 2 to 15 and more preferably 2 to 6 hydroxyl groups, and have a molecular weight of 400 to 6,000, preferably 800 to 3,000. The molecular weights are number average molecular weights ($M_n$) and are determined by end group analysis (OH number).

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and-(1, 3); butylene glycol-(1,4) and-(1,3); hexanediol-(1,6); octanediol-(1,8); neopentyl glycol; cyclohexanedimethanol (1,4-bis-hydroxymethylcyclohexane); 2-methyl -1,3-propanediol; 2,2,4- trimethyl-1,3-pentanediol; triethylene glycol; tetraethylene glycol; polyethylene glycol; dipropylene glycol; polypropylene glycol; dibutylene glycol and polybutylene glycol, glycerine, trimethylolpropane, 1,2,6-hexane triol, 1,2,4-butane triol, trimethylol ethane, pentaerythritol, mannitol, sorbitol, sucrose, hydroquinone and 1,1,1- or 1,1,2- tris-(hydroxylphenyl)-ethane. The polyesters may also contain a portion of carboxyl end groups. Polyesters of lactones, e.g. ε-caprolactone or hydroxycarboxylic acids, e.g. -hydroxycaproic acid, may also be used.

Polycarbonates containing hydroxyl groups include those known such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained form the above-mentioned polyesters or polylactones with phosgene, diaryl carbonates or cyclic carbonates.

The polyhydroxy polyacrylates preferably have at least two alcoholic hydroxyl groups per molecule as a statistical average, although a small portion of monohydroxyl compounds may be present. The polyhydroxy polyacrylates may be prepared by known methods such as those described in European Patent Office Publication 68,383, German Patentschrift 2,460,329, British Patent 1,515,868, U.S. Pat. No. 3,002,959, U.S. Pat. No. 3,375,227 or German Auslegeschrift 1,038,754. The polyhydroxy polyacrylates are generally prepared by the radical polymerization or copolymerization of a hydroxyalkyl ester of an unsaturated carboxylic acid, preferably acrylic or methacrylic acid, with itself or preferably together other hydroxyl-free unsaturated monomers.

Suitable hydroxyalkyl esters include esters containing 2 to 8, preferably 2 to 4 carbon atoms in the alkyl group and obtained from α,β-unsaturated carboxylic acids having 3 to 5 carbon atoms, such as acrylic, methacrylic, fumaric, maleic, itaconic or crotonic acid. The acrylic and methacrylic acid esters are preferred. Hydroxyalkyl esters of the above-mentioned acids containing ether bridges in the alkyl groups may also be used but are less preferred. The particularly preferred monomers with alcoholic hydroxyl groups include the 2-hydroxyethyl-, 2- and 3-hydroxypropyl-, and 2-, 3- and 4-hydroxybutyl-acrylates and -methacrylates. These monomers containing alcoholic hydroxyl groups may be prepared, for example, by the reaction of the above-mentioned acids with epoxides such as alkylene or propylene oxide.

The polyhydroxy polyacrylates which are used may also be prepared by reacting the corresponding polyacrylates containing carboxylic acid groups with alkylene oxides such as propylene oxide and/or ethylene oxide in the presence of suitable alkoxylation catalysts such as tetrabutylammonium bromide. The starting materials for this alkoxylation reaction, i.e., the polyacrylates containing carboxylic acid groups, are obtained in known manner by the copolymerization of unsaturated carboxylic acids such as acrylic acid and/or methacrylic acid with unsaturated comonomers which do not contain carboxyl or hydroxyl groups. The preferred method for preparing the polyhydroxy polyacrylates is the copolymerization of the hydroxyalkyl esters of unsaturated carboxylic acids previously set forth.

The comonomers used for the above-mentioned hydroxyl group-containing monomers may be any α,β-olefinically unsaturated compounds in the molecular weight range of 28 to 350 which are free from hydroxyl groups such as ethylene, propylene, butene-1, hexene-1, octene-1, styrene, α-methylstyrene, divinyl benzene, various isomeric vinyl toluenes, esters of α,β-unsaturated carboxylic acids of the type exemplified above monohydric aliphatic alcohols having 1 to 18, preferably 1 to 10 carbon atoms, in particular the corresponding esters of acrylic or methacrylic acids such as the methyl, ethyl, N-butyl, N-pentyl, N-hexyl, 2-ethylhexyl or octadecyl esters of acrylic or methacrylic acid.

Neutral esters of polycarboxylic acids are also suitable comonomers, for example, itaconic, crotonic, maleic or fumaric esters of the monohydric alcohols exemplified above.

Acrylic acid, methacrylic acid, vinyl acetate, acrylonitrile, methacrylonitrile and dienes such as isoprene or or butadiene are all suitable comonomers. Vinyl chloride may in principle also be used as a comonomer.

Particularly preferred polyhydroxy polyacrylates are obtained from about 10 to 50 parts by weight of hydroxyalkyl esters of acrylic or methacrylic acid, 0 to 80 parts by weight of styrene and/or α-methylstyrene, about 10 to 90 parts by weight of an acrylic and/or methacrylic acid ester free from hydroxyl group of the type exemplified above and 0 to about 5 parts by weight of an α,β-unsaturated mono- or dicarboxylic acid of the type exemplified, in particular acrylic acid or methacrylic acid.

The compositions may also contain a low molecular weight isocyanate-reactive component having an average molecular weight of up to 400. The low molecular weight compounds include the polyhydric alcohols which have been described for the preparation of the polyester polyols and also the low molecular weight polyamines which are known from polyurethane chemistry, e.g., the secondary diamines described in U.S. Pat. No. 5,126,170, herein incorporated by reference.

It is also possible in accordance with the present invention to incorporate the required structural units into polyol component. For example, the previously described compounds containing the group, H(R)N—NR—CO—, can be incorporated into polyhydroxy compounds containing anhydride groups by the formation of amide groups, or also imide groups when the group contains a primary amino group. Anhydride groups can be incorporated, e.g., into polyhydroxyl polyacrylates by including an unsaturated anhydride such as maleic anhydride in the monomers used for their preparation. Anhydride groups can also be incorporated into polyester polyols by prereacting the additive with, e.g, a polycarboxylic acid and then incorporating the resulting intermediate into the polyester through any remaining acid groups.

The amounts of the blocked polyisocyanate and polyhydroxy compounds are selected to provide an equivalent ratio of blocked isocyanate groups to isocyanate-reactive groups of about 0.5 to 2, preferably about 0.8 to 1.5 and more preferably about 0.9 to 1.2. If melamine resins or other crosslinkers are used in combination with the modified blocked polyisocyanate according to the invention, then lesser amounts of the polyisocyanate may be required.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methylpiperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

In accordance with the process of the present invention the one-component coating compositions may be applied in known manner directly to various substrates, preferably metal substrates, or they may be applied in known manner wet-on-wet to primers or basecoats, especially melamine resin-containing and/or acid-containing, e.g., acid-catalyzed, primers and basecoats, such as those used in the automotive industry. The organic additive which is chemically incorporated into the blocked polyisocyanate reduces the degree of yellowing which takes place when the coating compositions according to the invention are cured in the presence of melamine resins or acids, e.g., acid catalysts. As previously discussed, this situation occurs when the coating compositions according to the invention are applied wet-on-wet over coating compositions containing melamine resins and/or acids or when the coating compositions according to the invention contain acids and/or melamine resins. It is believed that this yellowing is caused by an interaction between the blocking agents and the acids and/or melamine resins when they come into contact with each other. Acids may be present in the one-component coating compositions according to the invention in the form of free acids, e.g., acid catalysts, or in the form residual acid present in polyols present in the one-component compositions, e.g., polyester polyols or polyhydroxy polyacrylates.

The coatings obtained in accordance with the process of the present invention are particularly light-fast and color-stable in the presence of heat and very resistant to abrasion. Furthermore, they are characterized by high hardness, elasticity, very good resistance to chemicals, high gloss, excellent weather resistance, excellent environmental etch resistance and good pigmenting qualities.

The invention is further illustrated, but is not intended to be limited by the following examples in which all parts and percentages are by weight unless otherwise specified. Isocyanate contents and equivalents weights are based on the weight of the solution unless otherwise specified.

EXAMPLES

Polyisocyanate I

An isocyanurate group-containing polyisocyanate present as a 90% solution in a 1:1 mixture of n-butyl acetate and Aromatic 100 solvent, prepared from 1,6-hexamethylene diisocyanate and having an isocyanate content of 19.5% by weight, a content of monomeric diisocyanate of <0.2% and a viscosity at 20° C. of 400–700 mPa.s.

Polyisocyanate II

An isocyanurate group-containing polyisocyanate present as a 70% solution in Aromatic 100 solvent prepared from isophorone diisocyanate and having an isocyanate content of 11.5% by weight, a content of monomeric diisocyanate of <0.5% and a viscosity at 20° C. of 1300 to 2700 mPa.s.

Polyisocyanate III

A round bottom flask was charged with 4,764.0 g of bis-(4-isocyanatocyclohexyl)-methane and 2,042.0 g of xylene. A nitrogen inlet tube was placed into the solution and a slow stream of nitrogen was bubbled through the solution for at least 30 minutes. The mixture was heated to 70° C. and then 23.8 g of a catalyst solution was added in one portion. The catalyst solution was prepared by mixing 47.2 9 of a 40% benzyltrimethylammonium hydroxide solution in methanol with 59.9 g of 1-butanol. The temperature rose to 89° C. due to the exothermic reaction. The flask was cooled with a water bath, and the temperature was maintained between 70° and 80° C. until an isocyanate content of 12.0% was obtained. The isocyanate content was determined either by titration or from a refractive index versus % NCO calibration curve. When the desired isocyanate content (12.0%) was achieved, 9.05 g of di-(2-ethylhexyl)phosphate were added to inactivate the catalyst. After stirring the solution for 40 minutes, 1,416.4 g of propylene glycol monomethyl ether acetate were added to the flask. This addition brought the temperature down to 50° C. At this point 1,547.7 g of methyl ethyl ketoxime were added to the stirred solution. The ketoxime was added in three portions in order to keep the reaction temperature below 70° C. The viscosity of the final product was 21,480 mPa.s at 25° C. The final product contained 0.60% of unblocked isocyanate groups.

Polyisocyanate IV

A 20 gallon reactor was charged with 39.62 kg of bis-(4-isocyanatocyclohexyl)-methane and 16.9 kg of xylene. A nitrogen inlet tube was placed into the solution and a slow stream of nitrogen was bubbled through the solution for at least 30 minutes. The mixture was heated to 70° C. and then 197.54 g of a catalyst solution was added in one portion. The catalyst solution was prepared by mixing 47.2 parts of a 40% benzyltrimethylamminium hydroxide solution in methanol with 59.9 parts of 1-butanol. The temperature rose to 85° C., due to the exothermic reaction. The temperature was maintained between 70° and 80° C., until an isocyanate content of 12.48% was obtained and then 75.53 g of di-(2-ethylhexyl)phosphate was added to inactivate the catalyst. The final product had a viscosity of 750 mPa.s at 25° C., a solids content of 70.0%, an isocyanate content of 12.48% and an equivalent weight of 336.5.

Polyisocyanate V

An isocyanurate group-containing polyisocyanate prepared from 1,6-hexamethylene diisocyanate and having an isocyanate content of 21.6% by weight, a content of monomeric diisocyanate of <0.2% and a viscosity at 20° C. of 3000 mPa.s.

Additive A

N-2,2,6,6-tetramethyl-4-piperidinyl-N-aminooxamide (Luchem HA-R100, available from Atochem).

Additive B 3,5-di-t-butyl-4-hydroxybenzene propionic hydrazide (Luchem AO-R300, available from Atochem).

Additive C

Benzoic hydrazide (available from Aldrich Chemical Co.).

Additive D

A round bottom flask was charged with 223.2 g of hydrazine hydrate (64% hydrazine by weight), 223.2 g of 2-propanol, and 223.2 g of toluene. To this mixture were added 500.0 g of propylene carbonate in three portions over a one hour time period. The temperature was not allowed to exceed 80° C. After stirring this mixture for one hour, the temperature was maintained at 80° C. and the excess solvent and water was removed under reduced pressure using a water aspirator. After one hour the temperature was raised to 100° C. and a full vacuum was used to remove the remaining solvent and water. After about 1.5 hours, the final product was a clear light yellow viscous liquid.

Blocked Polyisocyanate I 514.2 grams of Polyisocyanate V and 260 grams of Aromatic 100 solvent were added to a three neck, two liter, round bottom flask equipped with a mechanical stirrer and thermocouple. This mixture was stirred until homogeneous and then 208 grams of butanone oxime were added dropwise at a rate which allowed the exothermic reaction to keep the solution temperature at 50° C. When all of the butanone oxime had been added, the mixture was kept at 50°–60° C. for one additional hour. The isocyanate content was determined to be 1.1%. Next, 20 grams of Additive A were added and the mixture was heated to 80° C. to dissolve this powder. The solution was kept at 80° C. for two hours. At this time the isocyanate content was determined to be essentially zero by IR spectrum. 3.13 equivalent percent of the isocyanate groups of the polyisocyanate were modified with the anti-yellowing compound, i.e., Additive A.

Comparison Blocked Polyisocyanate I

The preparation of Blocked Polyisocyanate I was repeated with the exception that an additional amount of the blocking agent was used to block all of the isocyanate groups of Polyisocyanate V. This comparison product was not modified an anti-yellowing additive in accordance with the present invention.

Blocked Polyisocyanate II 852.9 grams of Polyisocyanate II were added to a three neck, two liter, round bottom flask quipped with a mechanical stirrer and thermocouple along with 297 grams of Aromatic 100 solvent. This mixture was stirred until homogeneous and then 86.9 grams of butanone oxime were added dropwise at a rate which allowed the exothermic reaction to keep the solution temperature at 50° C. When all of the butanone oxime had been added, the mixture was kept at 50° C. for one additional hour. The isocyanate content was determined to be 4.1%. Next, 24 grams of Additive A dissolved in 96 grams of butanone oxime were added and the mixture was heated to 75° C. to provide a homogeneous solution. The solution was kept at 80° C. for two hours. At this time the isocyanate content was determined to be essentially zero by IR spectrum. 4.21 equivalent percent of the isocyanate groups of the polyisocyanate were modified with the anti-yellowing compound, i.e., Additive A.

Blocked polyisocyanate III 568.7 grams of Polyisocyanate II were added to a three neck, one liter, round bottom flask equipped with a mechanical stirrer and thermocouple along with 109.4 grams of Aromatic 100 solvent. This mixture was stirred until homogeneous and then 121.9 grams of butanone oxime were added dropwise at a rate which allowed the exothermic reaction to keep the solution temperature at 50°—50° C. When all of the butanone oxime had been added, the mixture was kept at 50°–60° C. for one additional hour. The isocyanate content was determined to be 0.61%. Next, 12.6 grams of Additive C were added and the mixture was heated to 80° C. to provide a homogeneous solution. The solution was kept at 80° C. for two hours. At this time the isocyanate content was determined to be essentially zero by IR spectrum. 5.95 equivalent percent of the isocyanate groups of the polyisocyanate were modified with the anti-yellowing compound, i.e., Additive C.

Blocked Polyisocyanate IV 819 grams of bis-(4-isocyanatocyclohexyl)-methane and 287.5 grams of Aromatic 100 solvent were added to a three liter flask equipped with a mechanical stirrer and thermocouple. The mixture was stirred until homogeneous and then 391 grams of a polyester diol (MW 1700, prepared from adipic acid, 1,6-hexane diol and neopentyl glycol, molar ratio of diols 65:35), 66.7 grams of 2,2,4-trimethylpentane diol, and 0.6 grams of dibutyltin dilaurate were added. The mixture was heated to 90°–100° C. and maintained at that temperature until the isocyanate content was below 13.1% (approximately four hours). The solution was cooled to 50° C. and 278 grams of propylene glycol monomethyl ether acetate were added followed by the dropwise addition of 380.5 grams of butanone oxime at a rate which allowed the exothermic reaction to keep the reaction temperature at 50°–60° C. When all of the butanone oxime had been added, the mixture was stirred until the isocyanate content was 0.8% (1–2 hours). 46 grams of Additive A were added and the mixture was heated to 70° C. for two hours and then allowed to cool. 3.90 equivalent percent of the isocyanate groups of the polyisocyanate were modified with the anti-yellowing compound, i.e., Additive A.

Comparison Blocked Polyisocyanate II

The preparation of Blocked Polyisocyanate IV was repeated with the exception that an additional amount of the blocking agent was used to block all of the isocyanate groups of Polyisocyanate II. This comparison product was not modified with an anti-yellowing additive in accordance with the present invention.

Blocked Polyisocyanate V 568.6 grams of Polyisocyanate II were added to a three neck, two liter, round bottom flask equipped with a mechanical stirrer and thermocouple along with 109.4 grams of Aromatic 100 solvent. This mixture was stirred until homogeneous and then 121.9 grams of butanone oxime were added dropwise at a rate which allowed the exothermic reaction to keep the solution temperature at 50°–60° C. When all of the butanone oxime had been added the mixture was kept at 50°–60° C. For one additional hour. The isocyanate content was determined to be 0.64%. Next, 12.6 grams of Additive A were added and the mixture was heated to 75° C. to provide a homogeneous solution. The solution was kept at 80° C. for two hours. At this time the isocyanate content was determined to be essentially zero by IR spectrum. 3.34 equivalent percent of the isocyanate groups of the polyisocyanate were modified with the anti-yellowing compound, i.e., Additive A.

Blocked Polyisocyanate VI 568.6 grams of Polyisocyanate II were added to a three neck, two liter, round bottom flask equipped with a mechanical stirrer and thermocouple along with 109.4 grams of Aromatic 100 solvent. This mixture was stirred until homogeneous and then 121.9 grams of butanone oxime were added dropwise at a rate which allowed the exothermic reaction to keep the solution temperature at 50°–60° C. When all the butanone oxime had been added the mixture was kept at 50°–60° C. for one additional hour. The isocyanate content was determined to be 0.64%. Next, 12.6 grams of Additive B were added and the mixture was heated to 75° C. to provide a homogeneous solution. This solution was kept at 80° C. for two hours. At this time the isocyanate content was determined to be essentially zero by IR spectrum. 2.77 equivalent percent of the isocyanate groups of the polyisocyanate were modified with the anti-yellowing compound, i.e., Additive B.

Blocked Polyisocyanate VII

A round bottom flask was charged with 2,000.0 g of Polyisocyanate III. To this stirred solution were added 64.0 g of Additive B. The temperature was raised to 80° C. and maintained there for 2 to 3 hours. At this time an isocyanate content of 0.18% was found by titration. 10.0 g of methyl ethyl ketoxime were then added to completely react with the free isocyanate groups. The final product had a viscosity of 105,400 mPa.s at 25° C., a solids content of 65.6%, a blocked isocyanate content of 7.63%, and an equivalent weight of 550.5. 5.48 equivalent percent of the isocyanate groups of the polyisocyanate were modified with the anti-yellowing compound, i.e., Additive B.

Blocked Polyisocyanate VIII

A round bottom flask was charged with 2,000.0 g of Polyisocyanate III. To this stirred solution were added 30.0 g of Additive C. The temperature was raised to in excess of 80° C. and maintained for 2 to 3 hours. At this time an isocyanate content was 0.14% was found by titration. The final product had a viscosity of 67,440 mPa.s at 25° C., a solids content of 64.9%, a blocked isocyanate content of 7.79%, and an equivalent weight of 539.2. 5.51 equivalent percent of the isocyanate groups of the polyisocyanate were modified with the anti-yellowing compound, i.e., Additive C.

Blocked Polyisocyanate IX

A round bottom flask was charged with 2,000.0 g of Polyisocyanate III. To this stirred solution were added 53.0 g of Additive A. The temperature was raised to 80° C. and maintained there for 2 to 3 hours. At this time an isocyanate content was 0.37% was found by titration. The sample was filtered to remove Additive A. The final product had a viscosity of 166,600 mPa.s at 25° C., a solids content of 65.3%, a blocked isocyanate content of 7.71%, and an equivalent weight of 544.7. 5.48 equivalent percent of the isocyanate groups of the polyisocyanate were modified with the anti-yellowing compound, i.e., Additive A.

Comparison Blocked Polyisocyanate III

The preparation of Blocked Polyisocyanate IX was repeated with the exception that an additional amount of the blocking agent was used to block all of the isocyanate groups of Polyisocyanate III. This comparison product was not modified with an anti-yellowing compound in accordance with the present invention.

Blocked Polyisocyanate X

A round bottom flask was charged with 6,767.0 g of Polyisocyanate IV and 1,533.0 g of propylene glycol monomethyl ether acetate. To this stirred solution were slowly added 1,638.0 g of methyl ethyl ketoxime, while cooling the flask with a water bath. The temperature was not allowed to 80° C. After the addition was complete, the mixture was stirred at 50° C. for 1 hour. At this time 210.0 g of Additive A, as a solid, were added to the solution. The temperature was raised to 80° C. and maintained there for 2 hours; almost all of Additive A dissolved (some small pieces remained). At this point 60.0 g of methyl ethyl ketoxime were added to completely eliminate the "NCO" band in the infrared spectrum of the solution. The final product had a viscosity of 16,700 mPa.s at 25° C., a solids content of 65.0%, a blocked isocyanate content of 7.89%, and an equivalent weight of 532.3. 4.32 equivalent percent of the isocyanate groups of the polyisocyanate were modified with the anti-yellowing compound, i.e., Additive A.

Blocked Polyisocyanate XI

A round bottom flask was charged with 7,575.1 g of Polyisocyanate IV and 1,678.2 g of propylene glycol monomethyl ether acetate. In a separate flask 1,879.4 g of methyl ethyl ketoxime and 228.0 g of Additive A were heated until all of the solids had dissolved. This solution was then added to the first flask, while cooling the flask with a water bath. The temperature was not allowed to exceed 80° C. After the addition was complete, the mixture was stirred at 50° C. for 1 hour. The temperature was then raised to 80° C. and maintained there for 1 hour. At this time 40.8 g of methyl ethyl ketoxime were added to completely eliminate the "NCO" band in the infrared spectrum of the solution. This product was free of undissolved chunks of Additive A. The final product had a viscosity of 15,700 mPa.s at 25° C., a solids content of 65.4%, a blocked isocyanate content of 7.91%, and an equivalent weight of 531.0. 4.19 equivalent percent of the isocyanate groups of the polyisocyanate were modified with the anti-yellowing compound, i.e., Additive A.

Blocked Polyisocyanate XII

A round bottom flask was charged with 781.4 g of Polyisocyanate IV and 181.6 g of propylene glycol monomethyl ether acetate. In a separate flask 185.1 g of methyl ethyl ketoxime and 48.0 g of Additive A were heated to 60° C. until all of the solids dissolved. This solution was then added to the first flask, while cooling the flask with a water bath. The temperature was not allowed to exceed 80° C. After the addition was complete, the mixture was stirred at 50° C. for 1 hour. The temperature was then raised to 80° C. and maintained there for 2 hours. At this time 4.1 g of methyl ethyl ketoxime were added to completely eliminate the "NCO" band in the infrared spectrum of the solution. This product was free of undissolved chunks of Additive A. The final product had a viscosity of 157,000 mPa.s at 25° C., a solids content of 65%, a blocked isocyanate content of 7.4%, and an equivalent weight of 565.0. 8.54 equivalent percent of the isocyanate groups of the polyisocyanate were modified with the anti-yellowing compound, i.e., Additive A.

Blocked Polyisocyanate XIII 400 grams of Polyisocyanate II were added to a three neck, one liter, round bottom flask equipped with a mechanical stirrer and thermocouple and 43.9 grams of xylene were added. This mixture was stirred until homogeneous and then 74 grams of butanone oxime were added dropwise, with stirring, at a rate which allowed the exothermic reaction to keep the solution temperature at 50°–60° C. When all of the butanone oxime had been added the mixture was kept at 50°–60° C. for one additional hour. The isocyanate content was determined to be 0.61%. Next, 28.7 grams of Additive D were added along with 43.9 grams of propylene glycol monomethyl ether acetate and the mixture were heated to 80° C. to provide a homogeneous solution. The solution was kept at 80° C. for two hours. At this time the isocyanate content was determined to be essentially zero by titration. 11.1 equivalent percent of the isocyanate groups of the polyisocyanate were modified with the anti-yellowing compound, i.e., Additive D.

Blocked Polyisocyanate XIV

A round bottom flask was charged with 2,000.0 g of Polyisocyanate III. To this stirred solution were added 32.0 g of Additive D. The temperature was raised to 75°–80° C. and maintained for 2 to 3 hours. At this time an isocyanate content of 0.22% was found by titration. 10.0 g of methyl ethyl ketoxime were then added to completely react with the free isocyanate groups. The final product had a viscosity of 61,440 mPa.s at 25° C., a solids content of 65.1%, a blocked isocyanate content of 7.75%, and an equivalent weight of 541.9. 3.39 equivalent percent of the isocyanate groups of the polyisocyanate were modified with the anti-yellowing compound, i.e., Additive D.

Polyol I

A polyester polyol having an OH equivalent weight of 400, an OH content of 4.25% and a functionality of about 3.1 and prepared from 34.6 parts 1,6-hexane diol, 9.8 parts trimethylol propane, 30.43 parts isophthalic acid, 5.4 parts phthalic acid anhydride and 10.7 parts adipic acid.

Polyol II

A polyacrylate polyol prepared from 26.07% styrene, 26.07% hydroxyethyl acrylate, 46.88% butylacrylate and 0.98% acrylic acid.

Polyol III

A polyacrylate/polyester polyol mixture having an OH equivalent weight of 630, an OH content of 2.7% and an acid number of <10, present as a 65% solution in xylene, and containing 20% of Polyol I and 45% of Polyol II.

Polyol IV

A commercially available polyacrylate polyol.

Polyol V

A polyacrylate polyol having an OH equivalent weight of 597, an OH content of 2.8% and an acid number of <10, present as a 65% solution in xylene, and prepared from 38.6% styrene, 32.4% hydroxyethyl methacrylate, 24.0% butyl acrylate, 1.0% acrylic acid and 4.0% di-tert.-butyl peroxide.

Polyol VI

A polyacrylate polyol having an OH equivalent weight of 607, an OH content of 2.8% and an acid number of <10, present as a 65% solution in a 3:1 mixture of butyl acetate and xylene, and prepared from 41.95% styrene, 32.53% hydroxyethyl methacrylate, 24.57% butylacrylate and 0.95% acrylic acid.

Catalyst A

Dibutyltin diacetate (available as Metacure T-1 from Air Products and Chemicals).

Catalyst B

Dibutyltin dilaurate (available as Metacure T-12 from Air Products and Chemicals).

Additive 1

A hindered amine light stabilizer (available as Tinuvin 292 from Ciba-Geigy).

Additive 2

A benzotriazole light stabilizer (available as Tinuvin 384 from Ciba-Geigy).

Additive 3

A benzotriazole light stabilizer (available as Tinuvin 1130 from Ciba-Geigy).

Additive 4

A phenolic antioxidant (available as Irganox 1010 from Ciba-Geigy).

Additive 5

Tris(nonylphenyl)phosphite (available as TNPP from General Electric).

Additive 6

A tertiary amine catalyst (available as Desmorapid PP from Bayer AG).

Additive 7

An acrylate copolymer (available as Byk 358 from Byk Chemie).

Additive 8

A cellulose acetate butyrate (available as CAB 551–0.01 from Eastman).

Additive 9

A polyether modified dimethylpolysiloxane copolymer flow aid (available as Byk 301 from Byk Chemie).

Base Coat A

An acid catalyzed, melamine base coat was prepared in the following manner. The following ingredients were ground to a 6+ Hegman grind:

```
24.9 g of a polyester polyol (Cargill 5776, available
        from Cargill)
132.26 g of an acrylic polyol (Joncryl 500, available
        from S. C. Johnson)
158.7 g of titanium dioxide
52.9 g of talc
4.23 g of a grinding aid (Anti-Terra U, available from
        Byk Chemie) and
2.1 g of a flow aid (Modaflow 2100, available from
        Monsanto).
```

This grind base was then let down with

```
84.7 g of a melamine resin (Cymel 1130, available from
        American Cyanamid)
5.3 g of an acid catalyst (Cycat 4040, available from
        American Cyanamid) and
105.5 g of n-butyl acetate.
```

Base Coat B

A commercial acid-catalyzed white base coat.

Base Coat C

A commercial acid-catalyzed white base coat.

Base Coat D

A non-acid containing, melamine base coat was prepared in the following manner. The following ingredients were ground to a 6+ Hegman grind:

```
49.5 g of Polyol I
258.3 g of Polyol VI
300.0 g of titanium dioxide
86.0 g of methylethyl ketone and
200.0 g of n-butyl acetate.
```

This grind base was then let down with 105.9 g of a melamine resin (Cymel 1158, available from American Cyanamid).

General Procedure

An acid catalyzed acrylic melamine base coat was applied in two passes at a dry film thickness of 0.8–1.2 mils. Using a wet-on-wet application technique a clear coat was applied over the base coat at a dry film thickness of 1.6–2.0 mils. The percentages given in the tables for the crosslinkers are based solids, i.e., they exclude the weight of any solvent which may be present in the crosslinker. The base coat/clear coat system was baked at 150° C. for 30 minutes. Yellowing (ΔY.I.) was measured using ASTM 1925 with a D65 illuminate using a white standardization plaque as the standard unless otherwise noted.

Examples 1A–1G

Coating compositions were prepared using the polyisocyanate and blocked polyisocyanate crosslinkers set forth in Table 1 in combination with polyol III. All coating compositions were prepared at an NCO:OH equivalent ratio of 1.1:1. The coating compositions also contained 1% of Catalyst A, 2% of Additive 1, 2% of Additive 2, and 1% of Additive 7, based on resin solids. Clear coat compositions were applied over base coat A. Yellowing values (ΔY.I.) in Table 1 were normalized to Example 1A. The coating prepared in Example 1A was cured at 120° C. The percentages of the internal and external additives are based on total polyisocyanate solids, including any comparison blocked polyisocyanates which may be used in combination with the blocked polyisocyanates according to the invention.

TABLE 1

| Ex. No. | Crosslinker | Internal Additive | ΔY.I. |
|---|---|---|---|
| 1A (Std) | 40% Polyisocyanate I<br>60% Polyisocyanate II | — | 0 |
| 1B (Comp) | 40% Comp. Blocked Polyiso I<br>60% Comp. Blocked Polyiso II | — | 19.7 |
| 1C (Comp) | Comp. Blocked Polyiso III | — | 19.9 |
| 1D | Blocked Polyisocyanate XI | A, 1.3% | 6.2 |
|  |  | External Additive |  |
| 1E (Comp) | Comp. Blocked Polyiso III | 4, 2.26% | 17.1 |
| 1F (Comp) | Comp. Blocked Polyiso III | 6, 2.26% | 20.4 |
| 1G (Comp) | Comp. Blocked Polyiso III | 5, 2.26% | 36.7 |

Example 1A was used as the standard, i.e., an example wherein no blocking agent was present to cause yellowing. Examples 1B and 1C demonstrate the amount of yellowing which takes place when a blocking agent is present in the absence of the chemically incorporated additives of the present invention. Example 1D demonstrates the reduction in yellowing which takes place in accordance with the present invention. Examples 1E and 1G demonstrate the ineffectiveness of using known anti-yellowing additives such as phenolic antioxidants or phosphites. Example 1F demonstrates the ineffectiveness of using an amine to neutralize the effect of the acid present in the base coat.

Examples 2A–2E

Coating compositions were prepared using the blocked polyisocyanate crosslinkers set forth in Table 2 in combination Polyol IV. Coating compositions were prepared at an NCO:OH equivalent ratio of 1.1:1. The compositions also contained 1% of Catalyst A, 2% of Additive 1, 2% of Additive 2, and 1% of Additive 9, based on resin solids. In Examples 2B–2E the various Blocked Polyisocyanates shown in Table 2 were substituted for Comparison Blocked Polyisocyanate II on an equimolar basis rather than on an equivalent weight basis. Clear coat compositions were applied over base coat B. The percentages of the internal and external additives are based on total polyisocyanate solids, including any comparison blocked polyisocyanates which may be used in combination with the blocked polyisocyanates according to the invention.

TABLE 2

| Ex. No. | Crosslinker | Internal Additive | ΔY.I. |
|---|---|---|---|
| 2A (Comp) | 70% Comp. Blocked Polyiso II<br>30% Comp. Blocked Polyiso I | — | 11 |
| 2B | 78% Blocked Polyisocyanate VI<br>22% Comp. Blocked Polyiso I | B, 0.79% | 8.6 |
| 2C | 78% Blocked Polyisocyanate V<br>22% Comp. Blocked Polyiso I | A, 0.79% | 5.5 |
| 2D | 79% Blocked Polyisocyanate III<br>21% Comp. Blocked Polyiso I | C, 0.79% | 4.1 |
| 2E | 82% Blocked Polyisocyanate XIII<br>18% Comp. Blocked Polyiso I | D, 2.59% | 5.5 |

Examples 3A–3G

Coating compositions were prepared using the blocked polyisocyanate crosslinkers set forth in Table 3 in combination with Polyol III. Coating compositions were prepared at an NCO:OH equivalent ratio of 1.1:1. The compositions also contained 1% of Catalyst B, 2% of Additive 1, 2% of Additive 2, 1% of Additive 8, and 0.25% of Additive 7, based on resin solids. Clear coat compositions were applied over base coat B. The percentages of the internal and external additives are based on total polyisocyanate solids, including any comparison blocked polyisocyanates which may be used in combination with the blocked polyisocyanates according to the invention.

TABLE 3

| Ex. No. | Crosslinker | Internal Additive | ΔY.I. |
|---|---|---|---|
| 3A (Comp) | Comp. Blocked Polyiso III | — | 9.7 |
| 3B | 90% Comp. Blocked Polyiso III<br>10% Blocked Polyisocyanate VIII | C, 0.1% | 9.5 |
| 3C | 75% Comp. Blocked Polyiso III<br>25% Blocked Polyisocyanate VIII | C, 0.24% | 8.0 |
| 3D | 50% Comp. Blocked Polyiso III<br>50% Blocked Polyisocyanate VIII | C, 0.48% | 5.7 |
| 3E | 25% Comp. Blocked Polyiso III<br>75% Blocked Polyisocyanate VIII | C, 0.72% | 6.4 |
| 3F | Blocked Polyisocyanate VIII | C, 0.96% External Additive | 3.8 |
| 3G (Comp) | Comp. Blocked Polyiso III | C, 2.26% | 13.8 |

Example 3G demonstrates the ineffectiveness of using benzoic hydrazide as an additive relative to Examples 3B–3F where the benzoic hydrazide is chemically incorporated into the blocked polyisocyanate.

Examples 4A–4D

Coating compositions were prepared using the blocked polyisocyanate crosslinkers set forth in Table 4 in combination with Polyol III. Coating compositions were prepared at an NCO:OH equivalent ratio of 1.1:1. The compositions also contained 1% of Catalyst B, 2% of Additive 1, 2% of Additive 2, 1% of Additive 8, and 0.25% of Additive 7, based on resin solids. Clear coat compositions were applied over base coat B. The percentages of the internal and external additives are based on total polyisocyanate solids, including any comparison blocked polyisocyanates which may be used in combination with the blocked polyisocyanates according to the invention.

TABLE 4

| Ex. No. | Crosslinker | Internal Additive | ΔY.I. |
|---|---|---|---|
| 4A | Blocked Polyisocyanate VII | B, 2.0% | 7.11 |
| 4B | 75% Blocked Polyisocyanate VII<br>25% Comp. Blocked Polyiso III | B, 1.5% | 9.7 |
| 4C | 50% Blocked Polyisocyanate VII<br>50% Comp. Blocked Polyiso III | B, 1.0% | 9.7 |
| 4D | 25% Blocked Polyisocyanate VII<br>75% Comp. Blocked Polyiso III | B, 0.5% | 17 |

Examples 5A–5F

Coating compositions were prepared using the blocked polyisocyanate crosslinkers set forth in Table 5 in combination with Polyol III. Coating compositions were prepared at an NCO:OH equivalent ratio of 1.1:1. The compositions also contained 1% of Catalyst A, 1.3% of Additive 1, 1.3% of Additive 3, and 1% of Additive 8, based on resin solids. Clear coat compositions were applied over base coat C. The percentages of the internal and external additives are based on total polyisocyanate solids, including any comparison blocked polyisocyanates which may be used in combination with the blocked polyisocyanates according to the invention.

TABLE 5

| Ex. No. | Crosslinker | Internal Additive | ΔY.I. |
|---|---|---|---|
| 5A (Std) | 40% Polyisocyanate I<br>60% Polyisocyanate II | — | 6.88 |
| 5B (Comp) | Comp. Blocked Polyiso III | — | 16 |
| 5C | Blocked Polyisocyanate VII | B, 2.01% | 6.13 |
| 5D | Blocked Polyisocyanate VIII | C, 0.96% | 10.1 |
| 5E | Blocked Polyisocyanate IX | A, 1.68% | 6.63 |
| 5F | Blocked Polyisocyanate XIV | D, 1.02% | 9.62 |

Examples 6A–6H

Coating compositions were prepared using the blocked polyisocyanate crosslinkers set forth in Table 6 in combination with Polyol III. Coating compositions were prepared at an NCO:OH equivalent ratio of 1.1:1. The compositions in Examples 6A–6E contained 1% of Catalyst A, 2% of Additive 1, 2% of Additive 2, 0.25% of Additive 7 and 1% of Additive 8, resin solids. The compositions in Examples 6F–6H contained 1% of Catalyst B, 2% of Additive 1, 2% of Additive 2, 0.25% of Additive 7 and 1% of Additive 8. In addition, Examples 6F–6H contained Additive A as an additive in the percentages set forth in Table 6. Clear coat compositions were applied over base coat B. The percentages of the internal and external additives are based on total polyisocyanate solids, including any comparison blocked polyisocyanates which may be used in combination with the blocked polyisocyanates according to the invention.

TABLE 6

| Ex. No. | Crosslinker | Internal Additive | ΔY.I. |
|---|---|---|---|
| 6A (Comp) | Comp. Blocked Polyiso III | — | 9.7 |
| 6B | 75% Comp. Blocked Polyiso III 25% Blocked Polyisocyanate IX | A, 0.42% | 5.8 |
| 6C | 50% Comp. Blocked Polyiso III 50% Blocked Polyisocyanate IX | A, 0.84% | 4.6 |
| 6D | 25% Comp. Blocked Polyiso III 75% Blocked Polyisocyanate IX | A, 1.26% | 2.3 |
| 6E | Blocked Polyisocyanate IX | A, 1.68% External Additive | 1.9 |
| 6F (Comp) | Comp. Blocked Polyiso III | A, 1.12% | 13.2 |
| 6G (Comp) | Comp. Blocked Polyiso III | A, 2.23% | 7.9 |
| 6H (Comp) | Comp. Blocked Polyiso III | A, 4.47% | 8.2 |

Examples 6A–6E demonstrate the improvement in yellowing which may be obtained by the replacement of unmodified blocked polyisocyanates with the blocked polyisocyanates according to the invention containing the required chemically incorporated additive. In Examples 6B–6E the additive is chemically incorporated at levels of 0.5% to 1.8%, based on resin solids. Comparison Examples 6F–6H contained roughly the same amount of additive in external form as was present in Examples 6A–6E. The yellowness values indicate the additional improvement which may be obtained by chemically incorporating the additives.

Examples 7A–7C

Coating compositions were prepared using the polyisocyanate and blocked polyisocyanate crosslinkers set forth in Table 7 in combination with polyol V. All coating compositions were prepared at an NCO:OH equivalent ratio of 1.1:1. The coating compositions also contained 1% of Catalyst A, 2% of Additive 1 and 2% of Additive 2, based on resin solids, with the exception of Example 7A which did not contain Catalyst A. Clear coat compositions were applied over base coat D. Yellowing values (ΔY.I.) in Table 1 were normalized to Example 7A. The coating prepared in Example 7A was cured at 120° C. The percentages of the internal and external additives are based on total polyisocyanate solids, including any comparison blocked polyisocyanates which may be used in combination with the blocked polyisocyanates according to the invention.

TABLE 7

| Ex. No. | Crosslinker | Internal Additive | ΔY.I. |
|---|---|---|---|
| 7A (Std) | 40% Polyisocyanate I 60% Polyisocyanate II | — | 0 |
| 7B (Comp) | Comp. Blocked Polyiso III | — | 8.53 |
| 7C | Blocked Polyisocyanate XI | A, 1.26% | 1.1 |

Example 7A was used as the standard, i.e., an example wherein no blocking agent was present to cause yellowing. Example 7B demonstrates the amount of yellowing which takes place when a blocking agent is present in the absence of the chemically incorporated additives of the present invention. Example 7C demonstrates the reduction in yellowing which takes place in accordance with the present invention when a one-component clear coat is applied over a non-acid containing, melamine cross-linked base coat.

Examples 8A–8H

Coating compositions were prepared using the blocked polyisocyanate crosslinkers set forth in Table 8 in combination with polyol VII. All coating compositions were prepared at an NCO:OH equivalent ratio of 1.1:1. The ratio of pigment ($TiO_2$ R-960, DuPont) to binder was 0.8:1. The coating compositions also contained 1% of Additive 8 and 1% of a grinding aid (Anti-Terra U, available from Byk Chemie), based on resin solids. Catalyst B was added to the coating compositions in the amounts set forth in Table 8. The formulated systems were drawn down onto glass panels to a dry film thickness of 120 μm. Panels were preheated for 30 minutes at 100° C. and then post-baked at 210° C. for 15 minutes. b-Values (yellowness indicator) were then determined on an Applied Color Systems Spectrophotometer using a CS-5 chroma sensor. The light source used was D-65 to simulate normal day light conditions. The percentages of the internal and external additives are based on total polyisocyanate solids, including any comparison blocked polyisocyanates which may be used in combination with the blocked polyisocyanates according to the invention.

TABLE 8

| Ex. No. | Crosslinker | Cat. B (%) | Internal Additive | b-Value |
|---|---|---|---|---|
| 8A (Comp) | Comp Blocked Polyiso IV | 0 | — | 0.7 |
| 8B (Comp) | Comp Blocked Polyiso IV | 0.5 | — | 1.0 |
| 8C (Comp) | Comp Blocked Polyiso IV | 1.0 | — | 1.0 |
| 8D (Comp) | Comp Blocked Polyiso IV | 2.0 | — | 3.0 |
| 8E | Blocked Polyisocyanate XIII | 0 | A, 1.92% | 0.5 |
| 8F | Blocked Polyisocyanate XIII | 0.5 | A, 1.92% | 0.5 |
| 8G | Blocked Polyisocyanate XIII | 1.0 | A, 1.92% | 0.6 |
| 8H | Blocked Polyisocyanate XIII | 2.0 | A, 1.92% | 1.1 |

It is apparent from the preceding examples that the improvements in yellowing obtainable in accordance with the present invention are dependent upon the blocked polyisocyanate containing the anti-yellowing additive and are not dependent upon the particular isocyanate-reactive compound used prepare the one-component compositions. Even though other properties may vary, as is well known, depending upon the type of isocyanate-reactive compound and the components used to prepare it, the improvement in yellowness is primarily dependent upon the blocked polyisocyanate component containing the anti-yellowing additive.

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A process for preparing a coated substrate having a high glass and improved resistance to yellowing which comprises coating a substrate with a one-component coating composition comprising a) a blocked polyisocyanate which is the reaction product of a polyisocyanate with an oxime or lactam blocking agent for isocyanate groups and b) a compound containing at least two isocyanate-reactive groups, provided that component a) and/or component b) contains the group, —CO—(R)N—N(R)—CO—, wherein R represents hydrogen or an optionally substituted hydrocarbon radical, in an amount of 0.01 to 5% by weight, based on the solids content of components a) and b), by applying said one-component coating composition wet-on-wet to a coating composition containing acid groups and/or melamine resins which has previously been applied to the substrate or by adding a melamine resin to the one-component coating composition prior to applying it to the substrate, which may optionally have been precoated.

2. The process of claim 1 wherein said blocked polyisocyanate is the reaction product of a polyisocyanate with i) 60 to 99.9 equivalent percent, based on the equivalents of isocyanate groups of the polyisocyanate prior to blocking, of an oxime or lactam blocking agent for isocyanate groups and ii) 0.1 to 40 equivalent percent, based on the equivalents of isocyanate groups of the polyisocyanate prior to blocking, of hydrazine and/or a compound which is soluble in either the polyisocyanate, the blocking agent or an optional organic solvent for the polyisocyanate and contains the group, H(R)N—NR—CO—, wherein the carbonyl group is bound to carbon, oxygen or nitrogen and R represents hydrogen or an optionally substituted hydrocarbon radical.

3. The process of claim 1 wherein said blocking agent comprises methyl ethyl ketoxime.

4. The process of claim 2 wherein said blocking agent comprises methyl ethyl ketoxime.

5. The process of claim 1 wherein said group is incorporated by a 2,2,6,6-tetraalkyl-piperidine derivative containing one group corresponding to the formula H(R)N—N(R)—CO—.

6. The process of claim 2 wherein said group is incorporated by a 2,2,6,6-tetraalkyl-piperidine derivative containing one group corresponding to the formula H(R)N—N(R)—CO—.

7. A process for preparing a coated substrate having a high glass and improved resistance to yellowing which comprises coating a substrate with a one-component coating composition comprising a) a blocked polyisocyanate which is the reaction product of a polyisocyanate with an oxime or lactam blocking agent for isocyanate groups and b) a polyhydroxy polyacrylate and/or a polyhydroxy polyester, provided that component a) and/or component b) contains the group, —CO—(R)N—N(R)—CO—, wherein R represents hydrogen, in an amount of 0.01 to 5% by weight, based on the solids content of components a) and b), by applying said one-component coating composition wet-on-wet to a coating composition containing acid groups and/or melamine resins which has previously been applied to the substrate.

8. The process of claim 7 wherein said blocked polyisocyanate is the reaction product of a polyisocyanate with i) 60 to 99.9 equivalent percent, based on the equivalents of isocyanate groups of the polyisocyanate prior to blocking, of an oxime or lactam blocking agent for isocyanate groups and ii) 0.1 to 40 equivalent percent, based on the equivalents of isocyanate groups of the polyisocyanate prior to blocking, of hydrazine and/or a compound which is soluble in either the polyisocyanate, the blocking agent or an optional organic solvent for the polyisocyanate and contains the group, H(R)N—NR—CO—, wherein the carbonyl group is bound to carbon, oxygen or nitrogen and R represents hydrogen.

9. The process of claim 7 wherein said blocking agent comprises methyl ethyl ketoxime.

10. The process of claim 8 wherein said blocking agent comprises methyl ethyl ketoxime.

11. The process of claim 7 wherein said group is incorporated by a 2,2,6,6-tetraalkyl-piperidine derivative containing one group corresponding to the formula H(R)N—N(R)—CO—.

12. The process of claim 8 wherein said group is incorporated by a 2,2,6,6-tetraalkyl-piperidine derivative containing one group corresponding to the formula H(R)N—N(R)—CO—.

13. A coated substrate having a high glass and improved resistance to yellowing which is prepared by a process which comprises coating a substrate with a one-component coating composition comprising a) a blocked polyisocyanate which is the reaction product of a polyisocyanate with an oxime or lactam blocking agent for isocyanate groups and b) a compound containing at least two isocyanate-reactive groups, provided that component a) and/or component b) contains the group, —CO—(R)N—N(R)—CO—, wherein R represents hydrogen or an optionally substituted hydrocarbon radical, in an amount of 0.01 to 5% by weight, based on the solids content of components a) and b), by applying said one-component coating composition wet-on-wet to a coating composition containing acid groups and/or melamine resins which has previously been applied to the substrate or by adding a melamine resin to the one-component coating composition prior to applying it to the substrate, which may optionally have been precoated.

14. The coated substrate of claim 1 wherein said blocked polyisocyanate is the reaction product of a polyisocyanate with i) 60 to 99.9 equivalent percent, based on the equivalents of isocyanate groups of the polyisocyanate prior to blocking, of an oxime or lactam blocking agent for isocyanate groups and ii) 0.1 to 40 equivalent percent, based on the equivalents of isocyanate groups of the polyisocyanate prior to blocking, of hydrazine and/or a compound which is soluble in either the polyisocyanate, the blocking agent or an optional organic solvent for the polyisocyanate and contains the group, H(R)N—NR—CO—, wherein the carbonyl group is bound to carbon, oxygen or nitrogen and R represents hydrogen or an optionally substituted hydrocarbon radical.

15. The coated substrate of claim 13 wherein said blocking agent comprises methyl ethyl ketoxime.

16. The coated substrate of claim 14 wherein said blocking agent comprises methyl ethyl ketoxime.

17. The coated substrate of claim 13 wherein said group is incorporated by a 2,2,6,6-tetraalkyl-piperidine derivative containing one group corresponding to the formula H(R)N—N(R)—CO—.

18. The coated substrate of claim 14 wherein said group is incorporated by a 2,2,6,6-tetraalkyl-piperidine derivative containing one group corresponding to the formula H(R)N—N(R)—CO—.

19. A coated substrate having a high glass and improved resistance to yellowing which is prepared by a process which comprises coating a substrate with a one-component coating composition comprising a) a blocked polyisocyanate which is the reaction product of a polyisocyanate with an oxime or lactam blocking agent for isocyanate groups and b) a polyhydroxy polyacrylate and/or a polyhydroxy polyester, provided that component a) and/or component b) contains the group, —CO—(R)N—N(R)—CO—, wherein R represents hydrogen, in an amount of 0.01 to 5% by weight, based on the solids content of components a) and b), by applying said one-component coating composition wet-on-wet to a coating composition containing acid groups and/or melamine resins which has previously been applied to the substrate.

20. The coated substrate of claim 19 wherein said blocked polyisocyanate is the reaction product of a polyisocyanate with i) 60 to 99.9 equivalent percent, based on the equivalents of isocyanate groups of the polyisocyanate prior to blocking, of an oxime or lactam blocking agent for isocyanate groups and ii) 0.1 to 40 equivalent percent, based on the equivalents of isocyanate groups of the polyisocyanate prior to blocking, of hydrazine and/or a compound which is soluble in either the polyisocyanate, the blocking agent or an optional organic solvent for the polyisocyanate and contains the group, H(R)N—NR—CO—, wherein the carbonyl group is bound to carbon, oxygen or nitrogen and R represents hydrogen.

21. The coated substrate of claim 19 wherein said blocking agent comprises methyl ethyl ketoxime.

22. The coated substrate of claim 20 wherein said blocking agent comprises methyl ethyl ketoxime.

23. The coated substrate of claim 19 wherein said group is incorporated by a 2,2,6,6-tetraalkyl-piperidine derivative containing one group corresponding to the formula H(R)N—N(R)—CO—.

24. The coated substrate of claim 20 wherein said group is incorporated by a 2,2,6,6-tetraalkyl-piperidine derivative containing one group corresponding to the formula H(R)N—N(R)—CO—.

25. The process of claim 1 wherein said group is incorporated by a compound containing one group corresponding to the formula H(R)N—N(R)—CO—.

26. The process of claim 2 wherein said group is incorporated by a compound containing one group corresponding to the formula H(R)N—N(R)—CO—.

27. The process of claim 7 wherein said group is incorporated by a compound containing one group corresponding to the formula H(R)N—N(R)—CO—.

28. The process of claim 8 wherein said group is incorporated by a compound containing one group corresponding to the formula H(R)N—N(R)—CO—.

29. The coated substrate of claim 13 wherein said group is incorporated by a compound containing one group corresponding to the formula H(R)N—N(R)—CO—.

30. The coated substrate of claim 14 wherein said group is incorporated by a compound containing one group corresponding to the formula H(R)N—N(R)—CO—.

31. The coated substrate of claim 19 wherein said group is incorporated by a compound containing one group corresponding to the formula H(R)N—N(R)—CO—.

32. The coated substrate of claim 20 wherein said group is incorporated by a compound containing one group corresponding to the formula H(R)N—N(R)—CO—.

* * * * *